Figure 1:
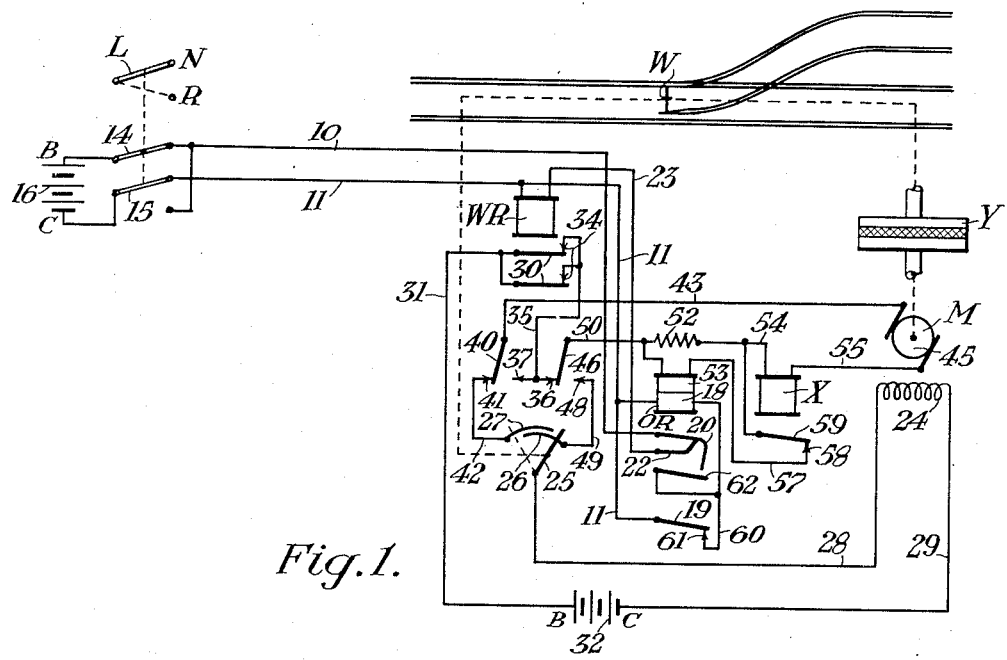

June 11, 1940.  B. E. O'HAGAN  2,203,920

MOTOR OVERLOAD PROTECTION SYSTEM

Filed Nov. 15, 1938

INVENTOR
Bernard E. O'Hagan.
BY
HIS ATTORNEY

Patented June 11, 1940

2,203,920

UNITED STATES PATENT OFFICE 2,203,920

MOTOR OVERLOAD PROTECTION SYSTEM

Bernard E. O'Hagan, Swissvale, Pa., assignor to The Union Switch & Signal Company, Swissvale, Pa., a corporation of Pennsylvania Application November 15, 1938, Serial No. 240,527

17 Claims. (Cl. 172—239)

My invention relates to a motor control system and particularly to improved means for protecting a motor in the event of an overload.

It has heretofore been proposed to provide a motor overload protection system incorporating an overload relay having a pick-up winding connected in series with the motor, and having a resistor with a positive thermal coefficient of resistance connected in parallel with the overload relay pick-up winding. In this system the various parts are proportioned so that the contacts of the overload relay are normally released but become picked up if the current taken by the motor exceeds a predetermined value for a predetermined time interval.

The motors employed with railway track switches drive the switches through the medium of a reduction gear and a friction clutch. The switch motor circuit is controlled by a contact movable with the switch so that the circuit of the switch motor is normally interrupted by the switch operated contact at the completion of each movement of the switch.

If, however, due to an obstruction, or for any other reason, the switch fails to complete its movement the clutch will slip, while the motor will take such a heavy current that after a short time interval the overload relay contacts will become picked up and interrupt the switch motor circuit.

The value of the current taken by the switch motor on obstruction of the switch is determined by the force required to slip the clutch, and the clutch is designed to require force sufficient that the current in the switch motor circuit will effect operation of the overload relay after a predetermined time interval.

While it is essential that the overload relay should operate to interrupt the switch motor circuit in the event the motor current continues at an abnormal value because of an obstruction to movement of the switch, it is also essential that the overload relay does not operate to interrupt the switch motor circuit in response to momentary surges of current in the switch motor circuit, such as are occasioned by starting of the motor or reversal of the motor while the switch is in transit from one position to the other.

In slow speed switches in which a reduction gear providing a large gear reduction is employed, unless an abnormally large clutch is employed, the current in the switch motor circuit when the clutch is slipping is of relatively small value. It has been found that if the overload relay is proportioned to respond to current of this value, and to interrupt the switch motor circuit at these times, that the overload relay may also operate to interrupt the switch motor circuit in response to momentary surges of current in the switch motor circuit occasioned by starting of the motor or reversal of the motor when the switch is in midstroke.

It is an object of my invention to provide a motor overload protection system incorporating means to prevent undesired operation of the overload relay in response to momentary surges of current in the motor circuit, such as occur on starting of the motor or on its reversal, while at the same time rendering the overload relay responsive to abnormal current flow in the motor circuit occasioned by an obstruction to movement of the mechanism driven by the motor.

A further object of my invention is to provide an improved motor overload protection system incorporating an auxiliary relay which becomes picked up in response to a momentary surge of current of unusually high value in the motor circuit, and which when picked up interrupts or otherwise controls the circuit of the overload relay pick-up winding to prevent undesired operation of the overload relay in response to these momentary surges of current in the motor circuit.

Other objects of my invention and features of novelty will be apparent from the following description taken in connection with the accompanying drawing.

I shall describe one form of control system embodying my invention, together with two modifications which I may employ, and shall then point out the novel features thereof in claims.

In the drawing the Fig. 1 is a diagram of a system embodying my invention, and

Figure 2:
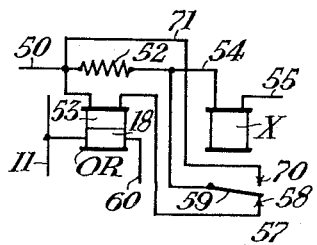
Figure 3:
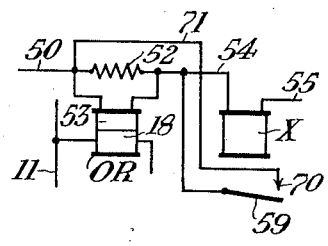

Figs. 2 and 3 are fragmentary diagrams illustrating modifications which I may employ.

Referring to Fig. 1 of the drawing, the reference character W designates a railway track switch which is movable between a normal and a reverse position by means of an electric motor M. The motor M drives the switch W through a reduction gear, not shown, and a friction clutch shown diagrammatically in the drawing and indicated by the reference character Y.

The clutch Y is arranged so that it normally transmits without slipping all of the torque developed by the motor M. In the event movement of the switch is obstructed, however, the motor draws increased current and the torque developed by the motor is increased to such an extent that the clutch is incapable of transmitting it with the result that slipping of the clutch elements occurs. The various parts of the clutch Y are also arranged so that when slipping of the clutch elements occurs, current of a predetermined relatively high value is present in the circuit of the switch motor M.

The system shown in the drawing includes a polarized switch control relay WR, an overload relay OR, and an auxiliary relay X.

The system also includes control wires 10 and 11 for supplying current to energize the winding of the switch control relay WR, while means is provided for supplying current of one or the other relative polarity to the control wires.

As shown, there is a control lever L which may be located at a point remote from the switch W, as in an interlocking tower, and which may be incorporated in an interlocking machine. The lever L is movable between a normal and a reverse position and operates movable contacts 14 and 15.

Contact 14 is constantly connected to terminal B of battery 16, while contact 15 is constantly connected to terminal C of the battery. When the lever L is in the normal position, as shown, contact 14 engages a contact to which is connected control wire 10, while contact 15 engages a stationary contact to which is connected control wire 11 with the result that current of one relative polarity, which may be considered normal relative polarity, is supplied to the control wires 10 and 11.

When the lever L is in the reverse position, contact 14 engages a stationary contact to which is connected control wire 11, while contact 15 engages a stationary contact to which is connected a branch of control wire 10 with the result that in the reverse position of the lever L current of the opposite or reverse relative polarity is supplied to the control wires 10 and 11.

The control wire 11 is constantly connected to one terminal of the winding of switch control relay WR, to one terminal of the holding winding 18 of overload relay OR, and also to movable contact 19 of overload relay OR.

Control wire 10 is constantly connected to movable contact 20 of relay OR, while contact 20, when released, engages a stationary contact 22 which is connected by a wire 23 to the other terminal of the winding of relay WR.

When the contacts of overload relay OR are released, therefore, a circuit is established to energize the winding of the switch control relay WR from the control wires 10 and 11. This circuit is traced from control wire 10 through contacts 20—22 of relay OR, wire 23, and winding of relay WR to control wire 11.

The switch W has associated therewith the contact 25 which is movable in accordance with movement of the switch. In all positions of the switch W except the reverse position contact 25 engages a stationary contact 26, while in all positions of the switch W except the normal position contact 25 engages a stationary contact 27.

Contact 25 is connected by wire 28 to one terminal of the motor field winding 24, while the other terminal of the field winding 24 is connected by wire 29 to terminal C of a battery 32.

The switch control relay WR has neutral contacts 30 which are connected by a wire 31 to terminal B of battery 32. The contacts 30, when picked up, engage stationary contacts 34 which are connected by wire 35 to normal polar contact 36 and reverse polar contact 37 of the relay WR.

The relay WR has a polar contact 40 which, when in the normal position as shown, engages a normal polar contact 41 which is connected by wire 42 to stationary contact 27. The contact 40, when in the reverse position, engages reverse polar contact 37, while the contact 40 is connected by means of wire 43 to one brush of the armature 45 of the switch motor M.

The relay WR has another polar contact 46, which when in the normal position as shown, engages normal polar contact 36, while when contact 46 is in the reverse position, it engages reverse polar contact 48 which is connected by wire 49 to contact 26.

The polar contact 46 is connected by wire 50 to one terminal of the resistor 52, and also the one terminal of the pick-up winding 53 of overload relay OR.

The other terminal of the resistor 52 is connected by wire 54 to one terminal of the auxiliary relay X, while the other terminal of the winding of the relay X is connected by wire 55 to a brush of the armature 45 of the switch motor M.

The other terminal of the pick-up winding 53 of overload relay OR is connected by wire 57 to stationary contact 58 of auxiliary relay X while contact 58 is engaged by a movable contact 59 of the relay when the contact is released. The contact 59 has connected thereto a branch of the wire 54 leading from resistor 52 to one terminal of the winding of auxiliary relay X.

It will be seen, therefore, that when the contact 59 of auxiliary relay X is released, the pick-up winding 53 of relay OR is connected in parallel with the resistor 52, while when the contact 59 of auxiliary relay X is picked up, the circuit of the overload relay pick-up winding 53 is interrupted.

The resistor 52 has a positive thermal coefficient of resistance, that is, the resistance of the unit increases as the temperature of the material of which it is constructed is increased.

The resistance unit 52 and the overload relay pick-up winding 53 are arranged and proportioned so that under normal operating conditions the preponderance of the current flowing in the circuit of the switch motor M flows through the resistance unit 52, and so little current flows in the pick-up winding 53 that the contacts of relay OR remain released.

The resistance unit 52 and the pick-up winding 53 are also arranged so that when current of one predetermined abnormally high value is present in the circuit of the motor M for a predetermined time interval, as is the case when movement of the switch W is obstructed, the material of which the resistance unit 52 is constructed becomes heated with the result that its resistance increases, and produces an increase in the flow of current in the pick-up winding 53 of relay OR sufficient to effect picking up of the relay contacts.

It will be seen that the operation of the overload relay is such that its contacts become picked up only when an abnormal current flow in the motor circuit continues for a substantial time interval, that is, for a period of time long enough to effect heating of the resistance unit 52 to a degree sufficient to increase the current flow in the pick-up winding 53 of relay OR sufficiently to cause picking up of the relay contacts.

If the abnormal current flow is only momentary, it will not result in sufficient heating of the resistance unit 52 to cause picking up of the contacts of overload relay OR, even though the peak value of the momentary current source considerably exceeds that of the current which if continued for a longer period of time would result in picking up of the overload relay contacts.

Accordingly the contacts of the relay OR will be picked up in response to the flow of current of one predetermined abnormal value in the motor circuit if continued for a substantial time interval, but will not become picked up in response to the flow of current of even greater magnitude than said one predetermined value if the current flow is of only momentary duration.

The contacts of relay OR, therefore, will become picked up in the event movement of the switch W is obstructed and current of abnormally high value flows in the switch motor circuit for a substantial time interval, while the relay contacts ordinarily will not become picked up in response to momentary surges of current such as are present on starting of the motor M or on reversal of the motor when the switch W is in mid-stroke.

One terminal of the holding winding 18 of overload relay OR is connected by wire 60 to stationary contact 61 of the relay, while a branch of this wire is connected to movable contact 62 of the overload relay. Contact 19 of overload relay OR, when released, engages contact 61 to establish a circuit shunting the overload relay holding winding 18. This circuit is traced from one terminal of the winding 18, through wire 60, contacts 61—19 of relay OR, and wire 11 to the other terminal of winding 18. As the holding winding 18 of overload relay OR is shunted when the contacts of the relay are released, the relay is rendered slow acting with the result that the contacts of the relay normally do not become picked up in response to momentary surges of current in the pick-up winding 53 of the relay.

On picking up of the contacts of the overload relay OR, contact 19 interrupts the shunt circuit for the holding winding 18, while contact 62 engages contact 20 to establish a circuit for energizing the holding winding 18 by current supplied from the control wires 10 and 11. This circuit is traced from control wire 10 through contacts 20—62 of relay OR, wire 60, holding winding 18, and control wire 11.

On further upward movement of the movable contact 62, contact 20 is moved out of engagement with contact 22, thereby interrupting the circuit of the winding of relay WR.

The relay X is proportioned so that its contact 59 is normally released and becomes picked up when and only when the current flowing in the circuit of the switch motor substantially exceeds that present when slipping of the clutch Y takes place. The relay X is proportioned so that its contacts become picked up when the current in the circuit of the switch motor is at the value present when the motor is being started, or when the motor is reversed while the switch W is in mid-stroke.

The equipment is shown in Fig. 1 of the drawing with the various parts of the apparatus in the positions which they assume when the control lever L and the switch W are in their normal positions, and when the contacts of relays OR and X are released.

At this time as the control lever L is in the normal position, current of normal relative polarity is supplied from battery 16 to control wires 10 and 11, while the winding of switch control relay WR is energized with the result that the neutral contacts 30 of the relay are picked up, while the polar contacts 40 and 46 are in their normal positions as shown.

At this time, however, switch operated contact 25 is out of engagement with contact 27 with the result that it interrupts the circuit of the switch motor M.

If at this time the operator desires to effect movement of the switch W to the reverse position, he may do so by moving the lever L from the normal to the reverse position. On this movement of the lever L, contacts 14 and 15 operate to effect the supply of current of reverse relative polarity to the control wires 10 and 11. On this reversal in the polarity of the current supplied to the control wires, there is a similar reversal in the direction of energization of the winding of the polarized relay WR with the result that the neutral contacts of this relay become released and thereafter become picked up, while the polar contacts 40 and 46 are shifted from their normal to their reverse positions.

On this movement of the contacts 40 and 46 to their reverse positions, a circuit is established to energize the switch motor M to cause it to move the switch W from the normal to the reverse position. This circuit is traced from terminal B of battery 32 through wire 31, neutral contacts 30—34 of relay WR, wire 35, reverse polar contacts 37—40 of relay WR, wire 43, motor armature 45, wire 55, winding of auxiliary relay X, wire 54, resistor 52, wire 50, polar contacts 46—48 of relay WR, wire 49, contact 26, switch operated contact 25, wire 28, motor field winding 24, and wire 29 to terminal C of battery 32.

On initial completion of the circuit of the switch motor M, contact 59 of auxiliary relay X is released with the result that pick-up winding 53 of overload relay OR is connected in parallel with resistance unit 52.

On completion of the circuit of the switch motor, there is an initial momentary surge of current of relatively high value in this circuit. This momentary current surge causes picking up of the contact 59 of auxiliary relay X, while contact 59, when picked up, interrupts the circuit of the overload relay pick-up winding 53 with the result that this winding cannot be energized, and accordingly the contacts of the overload relay OR will remain released.

Following the initial momentary surge of current of relatively high value in the circuit of the switch motor, there is a reduction in the value of the current flowing in this circuit, and the current is no longer of sufficient magnitude to maintain the contact 59 of auxiliary relay X picked up. Accordingly the contact 59 becomes released and engages contact 58 to reestablish the circuit of the pick-up winding 53 of overload relay OR.

However, at this time the value of the current flowing in the circuit of the switch motor M is insufficient to cause appreciable heating of the resistance unit 52, and the preponderance of the current in the switch motor circuit flows through the resistance unit 52, while so little current flows in the pick-up winding 53 of overload relay OR that the contacts of the relay OR remain released.

When the switch W attains the reverse position, switch operated contact 25 is moved out of engagement with contact 26 with the result that the circuit of the switch motor M is interrupted and the motor no longer drives the switch.

The system operates in a similar manner in effecting movement of the switch W from the reverse to the normal position. In order to effect this movement of the switch W the control lever L is moved from its reverse to its normal position, thereby operating contacts 14 and 15 to reestablish the supply of current of normal relative polarity to the control wires 10 and 11.

On this reversal in the polarity of the current supplied to the control wires 10 and 11, there is a similar reversal in the direction of energization of the winding of relay WR. Accordingly the neutral contacts 30 of this relay become released and thereafter become picked up again, while the polar contacts 40 and 46 are shifted from their reverse to their normal positions.

On this reversal in the position of the polar contacts 40 and 46 of the relay WR, a circuit is established to energize the switch motor M to cause it to move the switch W from the reverse to the normal position. This circuit is traced from terminal B of battery 32 through wire 31, neutral contacts 30—34 of relay WR, wire 35, polar contacts 36—46 of relay WR, resistance unit 52, wire 54, winding of auxiliary relay X, wire 55, armature 45 of motor M, wire 43, normal polar contacts 49—41 of relay WR, wire 42, contact 27, switch operated contact 25, wire 28, motor field winding 24, and wire 29 to terminal C of battery 32.

As previously explained, on initial completion of the circuit of the switch motor M, contact 59 of auxiliary relay X is released with the result that pick-up winding 53 of overload relay OR is connected in parallel with the resistance unit 52.

In addition, as previously explained, on initial completion of the circuit of the switch motor M, there is a momentary surge of current of abnormally high value in the circuit of the switch motor with the result that the contact 59 of auxiliary relay X becomes picked up to thereby interrupt the circuit of the pick-up winding 53 of relay OR, and thus prevent undesired picking up of the contacts of the overload relay at this time.

On a subsequent reduction in the value of the current in the switch motor circuit, contact 59 of auxiliary relay X becomes released and reestablishes the circuit of the pick-up winding 53 of relay OR, but, as previously explained, the flow of current in this winding at this time is insufficient to effect picking up of the relay contacts.

When the switch W attains the normal position, contact 25 is moved out of engagement with contact 27, thereby interrupting the circuit of the switch motor M with the result that the motor ceases to drive the switch W.

The system provided by my invention is arranged so that if for any reason it is desired to effect reversal of the switch motor M at a time when the motor is being operated to drive the switch W to either of its positions, the overload relay OR will not be operated to disconnect the switch control relay WR from the control wires 10 and 11.

For purposes of illustration it will be assumed that the switch W is being moved from the normal to the reverse position, and that while the switch is in transit the motor M is reversed and drives the switch in the other direction, that is, towards the normal position.

In order to effect movement of the switch W to the reverse position the control lever L is moved to the reverse position to effect the supply of current of reverse relative polarity to the switch control relay WR, while the polar contacts of this relay are moved to their reverse positions to establish the previously traced circuit for energizing the switch motor M to cause it to move the switch W to the reverse position.

In order to effect operation of the motor to return the switch W to the normal position, the lever L is restored to the normal position, thereby again effecting the supply of current of normal relative polarity to the control wires 10 and 11.

On this change in the polarity of the current supplied to the control wires, there is a similar change in the polarity of the current supplied to the winding of the switch control relay WR, and the neutral contacts 30 of this relay become released and thereafter pick up again, while the polar contacts 40 and 46 are shifted from their reverse to their normal positions, thereby interrupting the circuit for energizing the switch motor M to cause it to move the switch to the reverse position and establishing the circuit for the switch motor M to cause it to move the switch W to the normal position.

On this reversal in the direction of energization of the switch motor M, there is a sudden momentary surge of current of extremely large magnitude in the switch motor circuit. On flow of current of this value in the switch motor circuit, contact 59 of auxiliary relay X becomes picked up, thereby interrupting the circuit of the pick-up winding 53 of overload relay OR with the result that this winding cannot be energized and hence the contacts of the overload relay will remain released.

On subsequent reduction in the value of the current flowing in the switch motor circuit, the contact 59 of auxiliary relay X becomes released and reestablishes the circuit of the pick-up winding 53 of overload relay OR. However, at this time the current flowing in the switch motor circuit is of such value that it does not cause the resistance unit 52 to become heated and so little current flows in the pick-up winding 53 that the contacts of the overload relay remain released.

When the switch W reaches the normal position contact 25 is moved out of engagement with contact 27 to thereby interrupt the circuit of the switch motor, as previously explained.

The operation of the equipment on reversal in the direction of energization of the switch motor M at a time when the switch is being moved to the normal position is substantially the same as that just described and need not be described in detail.

The system provided by my invention is arranged so that in the event current of abnormal value flows in the circuit of the switch motor for a relatively long period of time, such as occurs when movement of the switch W is obstructed, the contacts of overload relay OR will become picked up to effect interruption of the switch motor circuit and thereby prevent injury to the switch motor.

For purposes of illustration, it will be assumed that the switch W is being moved from the normal to the reverse position, and that while the switch is in transit its movement is obstructed so that the switch cannot complete its movement.

In order to effect this movement of the switch W to the reverse position, lever L is moved to the reverse position and contacts 14 and 15 effect the supply of current of reverse relative polarity to the control wires 10 and 11, while current of this polarity is supplied to the winding of relay WR.

As relay WR is energized with current of reverse relative polarity, its neutral contacts 30 are picked up and its polar contacts 40 and 46 are shifted to their reverse positions and establish the previously traced circuit for energizing the switch motor M to cause it to move the switch W to the reverse position.

On the occurrence of the obstruction to movement of the switch W, further movement of the switch is prevented, and as the motor M continues to be energized, there is an increase in the current taken by the motor M until the motor develops sufficient torque to effect slipping of the elements of the clutch Y.

On this increase in the value of the current flowing in the circuit of the switch motor M, there is a corresponding increase in the flow of current in the resistance unit 52 with the result that the material of which this unit is constructed becomes heated and its resistance increases, thereby increasing the flow of current in the pick-up winding 53 of overload relay OR. When the abnormal current flow in the switch motor circuit has continued for a predetermined time interval, the resistance of the resistance unit 52 is increased to such a degree that so much of the current in the switch motor circuit flows through the pick-up winding 53 of relay OR that the contacts of the relay become picked up.

As previously pointed out, the value of the current flowing in the switch motor circuit at the time the elements of the clutch Y are caused to slip is insufficient to effect picking up of contact 59 of relay X. Accordingly contact 59 of relay X remains released at this time and maintains the circuit of the pick-up winding 53 of relay OR so that this winding is energized and is effective to pick up the contacts of the overload relay.

On picking up of the contacts of overload relay OR, contact 19 is moved out of engagement with contact 61, thereby interrupting the circuit shunting the holding winding 18, while contact 62 engages contact 26 to establish a circuit for energizing the holding winding 18 with current supplied by the control wires 10 and 11. This circuit is traced from control wire 10 through contacts 20—62 of relay OR, wire 60 to one terminal of the holding winding 18, while the other terminal of the holding winding has a branch of control wire 11 connected thereto.

On further upward movement of the contacts of overload relay OR, contact 62 moves contact 20 out of engagement with contact 22, thereby interrupting connection from control wire 10 to wire 23 leading to one terminal of the winding of polarized switch control relay WR. The winding of relay WR, therefore, is deenergized and the neutral contacts 39 of this relay become released to interrupt the energizing circuit for the switch motor M.

On interruption of the switch motor circuit, the pick-up winding 53 of relay OR is no longer energized, but at this time the holding winding 18 is energized and maintains the relay contact picked up.

The holding winding 18 and the pick-up winding 53 are arranged so that the polarity of the current supplied from the control wires 10 and 11 for energizing the holding winding 18 agrees with that supplied to the pick-up winding 53. Accordingly these windings, when energized, assist each other and both operate to maintain the relay contacts picked up.

If following obstruction to movement of the switch W the operator wishes to return the switch to the position from which it was being moved when the obstruction occurred, in this case the normal position, he may do so by moving the control lever L to the normal position. On this movement of the control lever L from the reverse to the normal position, current of normal relative polarity is again supplied to the control wires 10 and 11, while there is a reversal in the direction of energization of the holding winding 18 of overload relay OR.

On this reversal of the direction of energization of winding 18, the contacts of the overload relay OR become released and contact 62 is disengaged from contact 20, thereby interrupting the circuit for energizing the holding winding 18 from the control wires 10 and 11. Accordingly, once the contacts of overload relay OR are released, they do not thereafter become picked up since the holding winding 18 cannot become energized from the control wires 10 and 11.

On release of the contacts of the overload relay OR, contact 20 moves into engagement with contact 22 to reestablish connection from control wire 10 to wire 23 leading to one terminal of the winding of switch control relay WR.

As a result, the winding of relay WR is again energized with current of normal relative polarity and the neutral contacts 39 of this relay become picked up, while the polar contacts 40 and 46 are shifted from their reverse to their normal positions to reestablish the circuit for the switch motor M to cause the motor M to return the switch W to the normal position. When the switch attains the normal position contact 25 is moved out of engagement with contact 27 and interrupts the switch motor circuit.

The system operates in a similar manner in the event movement of the switch is obstructed at a time when the switch is being moved from the reverse to the normal position. If such obstruction occurs, the contacts of the overload relay OR become picked up and disconnect the winding of relay WR from the control wires 10 and 11 with the result that the neutral contacts of relay WR become released and interrupt the switch motor circuit.

In addition, on picking up of the contacts of overload relay OR, a circuit is established to energize the holding winding 18 of the overload relay from the control wires 10 and 11, while on reversal of the polarity of the current supplied to the control wires 10 and 11, the contacts of overload relay OR become released, as previously explained, and the switch control relay WR reestablishes the circuit for the switch motor M to cause the motor M to return the switch W to the reverse position.

From the foregoing it will be seen that this system is arranged so that the overload relay OR will operate to effect interruption of the switch motor circuit when required to protect the motor, while the auxiliary relay X serves to prevent operation of the overload relay when such operation of the overload relay is not necessary to protect the motor and when operation of the overload relay would interfere with the intended operation of the switch motor.

Thus on the occurrence of surges of current of extremely high value, but only of momentary duration in the circuit of the switch motor, the contact 59 of the auxiliary relay becomes picked up to interrupt the circuit of the pickup winding of the overload relay and thus prevent undesired picking up of the overload relay contacts at such times.

However, on the occurrence of continued abnormal flow of current of somewhat lesser value in the circuit of the switch motor, that is current of a value which would result in injury to the motor if not interrupted, the overload relay contacts will become picked up and will effect interruption of the switch motor circuit and thus prevent injury to the switch motor.

Since the auxiliary relay X prevents undesired operation of the overload relay OR in response to momentary surges of current in the switch motor circuit, the overload relay may be made somewhat more sensitive than would otherwise be possible.

Accordingly the overload relay OR may be proportioned to respond to the current values present in the circuit of the switch motor when slipping of the clutch elements occurs even though the motor drives the clutch through a reduction gear providing a large gear reduction with the result that current of relatively low value is present in the switch motor circuit at the time slipping of the clutch elements occurs.

If the auxiliary relay were not provided and the overload relay were proportioned to respond to the relatively low current values present when slipping of the clutch elements occurs, there is a possibility that the overload relay would operate in response to the momentary surges of current present in the switch motor circuit on starting of the motor or on its reversal. In this system, however, the auxiliary relay serves to prevent operation of the overload relay in response to momentary current surges of extremely high value so that unintended operation of the overload relay at such times cannot occur.

In Fig. 2 of the drawing, I have shown a modification which I may employ. In the system shown in this figure of the drawing, contact 59 of auxiliary relay X, when picked up, engages a stationary contact 70 which is connected by a wire 71 to the terminal of resistance unit 52 to which wire 50 is connected.

Accordingly, when contact 59 of relay X becomes picked up, it not only interrupts the circuit of the pick-up winding 52 of overload relay OR, but it also establishes a circuit shunting the resistance unit 52. This shunt circuit includes wire 71, contacts 70—59 of relay X, and wire 54.

As the resistance unit 52 is shunted when the contact 59 of auxiliary relay X is picked up, the unusually heavy current flowing in the switch motor circuit at this times does not flow through the resistance unit 52, but flows through the shunt circuit established by contact 59 of auxiliary relay X. As this unusually heavy current does not flow through the resistance unit 52, it does not cause this unit to become heated, and hence the resistance of the unit is not increased at these times.

Accordingly, on subsequent termination of the comes picked up, it not only interrupts the circuit of the motor M, and on reduction of this current to the normal value, which results in release of contact 59 of auxiliary relay X to reestablish the circuit of the pick-up winding 53 of relay OR and to interrupt the circuit shunting the resistor 52, there is no possibility that the resistance of the resistance unit 52 will be so high that the flow of current in the overload relay pick-up winding 53 will effect picking up of the contacts of the overload relay.

It will be seen, therefore, that the modification shown in Fig. 2 of the drawing provides protection against undesired operation of the overload relay subsequent to release of the contact of the auxiliary relay.

While the system shown in Fig. 2 of the drawing has been illustrated and described as having the contact 59 of auxiliary relay X control the circuit of the pick-up winding 53 of overload relay OR, it is contemplated that this winding might be permanently connected in parallel with the resistance unit 52, and that the auxiliary relay contact operate only to control a circuit shunting the resistance unit 52 and the overload relay pick-up winding. Fig. 3 of the drawing is a diagram illustrating this modification.

In the modification shown in Fig. 3, contact 59 of relay X, when picked up, establishes a circuit shunting the resistance unit 52 and also shunting the pick-up winding 53 of the overload relay OR. As the pick-up winding of the overload relay is shunted when an unusually heavy surge of current is flowing in the motor circuit, the contacts of the overload relay will not become picked up in response to such current flow.

Similarly, as pointed out above, as the resistance unit 52 is shunted when contact 59 of auxiliary relay X is picked up, the resistance unit does not become heated by the unusually heavy current flowing in the motor circuit at such time, and there is no possibility that undesired picking up of the overload relay contacts will occur on release of the contacts of the auxiliary relay.

While the motor overload protection system provided by this invention has been illustrated and described in connection with the motor for operating a railway track switch, it should be understood that the invention is not limited to use in such locations, but that it is applicable to other situations where similar operating conditions are encountered.

Although I have herein shown and described one form of the improved motor overload protection system embodying my invention, together with two modifications thereof, it is to be understood that numerous changes and modifications may be made therein within the scope of the appended claims without departing from the spirit and scope of my invention.

Having thus described my invention, what I claim is:

1. In a motor control system, in combination, an electric motor, a circuit for energizing said motor, an overload relay having a winding, means for energizing said winding in accordance with the value of the current in the motor circuit, said relay having an armature which is movable between a normal and an operated position, said armature normally assuming said normal position and being moved to the operated position when the current in the motor circuit exceeds one predetermined value for a predetermined time interval, means controlled by said relay armature and operative on movement of said armature to its operated position to interrupt the circuit of the motor, an auxiliary relay having a winding, means for energizing the auxiliary relay winding in accordance with the value of the current in the motor circuit said auxiliary relay having an armature which is movable between a normal and an operated position, said auxiliary relay armature normally assuming its normal position and being moved to the operated position when the current in the motor circuit exceeds a value substantially higher than said one predetermined value, and means controlled by said auxiliary relay armature and operative while said auxiliary relay armature is in the operated position to render the overload relay non-responsive to current flowing in the motor circuit.

2. In a motor control system, in combination, an electric motor, a circuit for energizing said motor, an overload relay having a winding, means for energizing said winding in accordance with the value of the current in the motor circuit, said relay having an armature which is movable between a normal and an operated position, said armature normally assuming said normal position and being moved to the operated position when the current in the motor circuit exceeds one predetermined value for a predetermined time interval, means controlled by said relay armature and operative on movement of said armature to its operated position to interrupt the circuit of the motor, an auxiliary relay having a winding, means for energizing the auxiliary relay winding in accordance with the value of the current in the motor circuit, said auxiliary relay having an armature which is movable between a normal and an operated position, said auxiliary relay armature normally assuming its normal position and being moved to the operated position when the current in the motor circuit exceeds a value substantially higher than said one predetermined value, and means controlled by said auxiliary relay armature and operative while said auxiliary relay armature is in the operated position to interrupt the circuit of the overload relay winding.

3. In a motor control system, in combination, an electric motor, a circuit for energizing said motor, an overload relay having a winding, means for energizing said winding in accordance with the value of the current in the motor circuit, said relay having an armature which is movable between a normal and an operated position, said armature normally assuming said normal position and being moved to the operated position when the current in the motor circuit exceeds one predetermined value for a predetermined time interval, means controlled by said relay armature and operative on movement of said armature to its operated position to interrupt the circuit of the motor, an auxiliary relay having a winding, means for energizing the auxiliary relay winding in accordance with the value of the current in the motor circuit, said auxiliary relay having an armature which is movable between a normal and an operated position, said auxiliary relay armature normally assuming its normal position and being moved to the operated position when the current in the motor circuit exceeds a value substantially higher than said one predetermined value, and means controlled by said auxiliary relay armature and operative while said auxiliary relay armature is in the operated position to establish a circuit shunting the overload relay winding.

4. In a motor control system, in combination, an electric motor, a circuit for energizing said motor, a resistance unit connected in series with said motor circuit, said resistance unit having a positive thermal coefficient of resistance, an overload relay having a winding connected in parallel with said resistance unit, said relay having an armature which is movable between a normal and an operated position, said armature being biased to the normal position, the overload relay and the resistance unit being arranged and proportioned so that the relay armature is moved to its operated position if the current in the motor circuit exceeds one predetermined value for a predetermined time interval, means controlled by said relay armature and operative on movement of said armature to its operated position to interrupt the circuit of the motor, an auxiliary relay having a winding, means for energizing the auxiliary relay winding in accordance with the value of the current in the motor circuit, said auxiliary relay having an armature which is movable between a normal and an operated position, said auxiliary relay armature normally assuming its normal position and being moved to its operated position when the current in the motor circuit exceeds a value substantially higher than said one predetermined value, and means operative while said auxiliary relay armature is in its operated position to render the overload relay non-responsive to current flowing in the motor circuit.

5. In a motor control system, in combination, an electric motor, a circuit for energizing said motor, a resistance unit connected in series with said motor circuit, said resistance unit having a positive thermal coefficient of resistance, an overload relay having a winding connected in parallel with said resistance unit, said relay having an armature which is movable between a normal and an operated position, said armature being biased to the normal position, the overload relay and the resistance unit being arranged and proportioned so that the relay armature is moved to its operated position if the current in the motor circuit exceeds one predetermined value for a predetermined time interval, means controlled by said relay armature and operative on movement of said armature to its operated position to interrupt the circuit of the motor, an auxiliary relay having a winding, means for energizing the auxiliary relay winding in accordance with the value of the current in the motor circuit, said auxiliary relay having an armature which is movable between a normal and an operated position, said auxiliary relay armature normally assuming its normal position and being moved to its operated position when the current in the motor circuit exceeds a value substantially higher than said one predetermined value, and means operative while said auxiliary relay armature is in its operated position to interrupt the circuit of the overload relay winding.

6. In a motor control system, in combination, an electric motor, a circuit for energizing said motor, a resistance unit connected in series with said motor circuit, said resistance unit having a positive thermal coefficient of resistance, an overload relay having a winding connected in parallel with said resistance unit, said relay having an armature which is movable between a normal and an operated position, said armature being biased to the normal position, the overload relay and the resistance unit being arranged and proportioned so that the relay armature is moved to its operated position if the current in the motor circuit exceeds one predetermined value for a predetermined time interval, means controlled by said relay armature and operative on movement of said armature to its operated position to interrupt the circuit of the motor, an auxiliary relay having a winding, means for energizing the auxiliary relay winding in accordance with the value of the current in the motor circuit, said auxiliary relay having an armature which is movable between a normal and an operated position, said auxiliary relay armature normally assuming its normal position and being moved to its operated position when the current in the motor circuit exceeds a value substantially higher than said one predetermined value, and means operative while said auxiliary relay armature is in its operated position to interrupt the circuit of the overload relay winding and to establish a circuit shunting the resistance unit.

7. In a motor control system, in combination, an electric motor, a circuit for energizing said motor, a resistance unit connected in series with said motor circuit, said resistance unit having a positive thermal coefficient of resistance, an overload relay having a winding connected in parallel with said resistance unit, said relay having an armature which is movable between a normal and an operated position, said armature being biased to the normal position, the overload relay and the resistance unit being arranged and proportioned so that the relay armature is moved to its operated position if the current in the motor circuit exceeds one predetermined value for a predetermined time interval, means controlled by said relay armature and operative on movement of said armature to its operated position to interrupt the circuit of the motor, an auxiliary relay having a winding, means for energizing the auxiliary relay winding in accordance with the value of the current in the motor circuit, said auxiliary relay having an armature which is movable between a normal and an operated position, said auxiliary relay armature normally assuming its normal position and being moved to its operated position when the current in the motor circuit exceeds a value substantially higher than said one predetermined value, and means operative while said auxiliary relay armature is in its operated position to establish a circuit shunting the resistance unit.

8. In a motor control system, in combination, an electric motor, a circuit for energizing said motor, a resistance unit connected in series with said motor circuit, said resistance unit having a positive thermal coefficient of resistance, an overload relay having a winding connected in parallel with said resistance unit, said relay having an armature which is movable between a normal and an operated position, said armature being biased to the normal position, the overload relay and the resistance unit being arranged and proportioned so that the relay armature is moved to its operated position if the current in the motor circuit exceeds one predetermined value for a predetermined time interval, means controlled by said relay armature and operative on movement of said armature to its operated position to interrupt the circuit of the motor, an auxiliary relay having a winding, means for energizing the auxiliary relay winding in accordance with the value of the current in the motor circuit, said auxiliary relay having an armature which is movable between a normal and an operated position, said auxiliary relay armature normally assuming its normal position and being moved to its operated position when the current in the motor circuit exceeds a value substantially higher than said one predetermined value, and means operative while said auxiliary relay armature is in its operated position to establish a circuit shunting the resistance unit and also shunting the overload relay winding.

9. In a motor control system, in combination, a driven member, a friction clutch, an electric motor for driving said member through said clutch, said clutch normally transmitting without slipping the torque developed by the motor and being arranged to slip if the torque required to drive the driven member exceeds a predetermined value, an overload relay responsive to the value of the current in the motor circuit, said overload relay controlling the motor circuit and being operative to interrupt the motor circuit if the value of the current therein remains for a predetermined time interval at the value present when slipping of the clutch occurs, an auxiliary relay responsive to the value of the current in the motor circuit, said auxiliary relay being operative when the value of the current in the motor circuit is substantially higher than that present when slipping of the clutch occurs to render the overload relay non-responsive to current flowing in the motor circuit.

10. In a motor control system, in combination, a driven member, a friction clutch, an electric motor for driving said member through said clutch, said clutch normally transmitting without slipping the torque developed by the motor and being arranged to slip if the torque required to drive the driven member exceeds a predetermined value, an overload relay having a winding, a circuit for energizing said overload relay winding in accordance with the current in the motor circuit, the overload relay controlling the motor circuit and being operative to interrupt the motor circuit if the value of the current therein remains for a predetermined time interval at the value present when slipping of the clutch occurs, an auxiliary relay responsive to the value of the current in the motor circuit, said auxiliary relay being operative when the value of the current in the motor circuit is substantially higher than that present when slipping of the clutch occurs to interrupt the circuit of the winding of the overload relay.

11. In a motor control system, in combination, a driven member, a friction clutch, an electric motor for driving said member through said clutch, said clutch normally transmitting without slipping the torque developed by the motor and being arranged to slip if the torque required to drive the driven member exceeds a predetermined value, an overload relay having a winding, a circuit for energizing said overload relay winding in accordance with the current in the motor circuit, the overload relay controlling the motor circuit and being operative to interrupt the motor circuit if the value of the current therein remains for a predetermined time interval at the value present when slipping of the clutch occurs, an auxiliary relay responsive to the value of the current in the motor circuit, said auxiliary relay being operative when the value of the current in the motor circuit is substantially higher than that present when slipping of the clutch occurs to establish a circuit shunting the winding of the overload relay.

12. In a motor control system, in combination, an electric motor, a circuit for energizing said motor, an overload relay having an operating winding and a holding winding, means for energizing the operating winding in accordance with the value of the current in the motor circuit, said relay having an armature having a normal position, said armature being moved to an operated position by the operating winding when the current in the motor circuit exceeds one predetermined value for a predetermined time interval, means controlled by said relay armature and operative on movement of said armature to its operated position to interrupt the circuit of the motor and to establish a circuit for energizing the overload relay holding winding, the holding winding being effective when energized to maintain the armature in said operated position, an auxiliary relay having a winding, means for energizing said auxiliary relay winding in accordance with the value of the current in the motor circuit, said auxiliary relay having an armature having a normal position, said auxiliary relay armature being moved to an operated position when the current in the motor circuit exceeds a value substantially higher than said one predetermined value, means controlled by said auxiliary relay armature and operative while the auxiliary relay armature is in its operated position to render the overload relay operating winding non-responsive to current in the motor circuit, and means for controlling the circuit of the overload relay holding winding to effect release of the overload relay armature.

13. In a motor control system, in combination, an electric motor, a circuit for energizing said motor, a resistance unit connected in series with said motor circuit, said resistance unit having a positive thermal coefficient of resistance, an overload relay having an operating winding connected in parallel with said resistance unit, the overload relay having an armature having a normal position, said armature being moved from the normal position to an operating position when the current in the motor circuit exceeds one predetermined value for a predetermined time interval, the overload relay armature being effective in its operating position to interrupt the circuit of the motor, an auxiliary relay having a winding connected in series with the motor circuit, the auxiliary relay having an armature having a normal position, said auxiliary relay armature being moved to an operating position when the current in the motor circuit exceeds a value substantially higher than said one predetermined value, and means controlled by the auxiliary relay armature and operative when said auxiliary relay armature is in its operating position to render the overload relay non-responsive to current in the motor circuit.

14. In a motor control system, in combination, an electric motor, a polarized control relay operative when energized with current of one relative polarity to establish a normal supply circuit to effect operation of the motor in one direction, said control relay being operative when energized with current of the opposite relative polarity to establish a reverse supply circuit to effect operation of the motor in the other direction, the control relay being operative when deenergized to interrupt both of said supply circuits, a control circuit for energizing said control relay with current of one or the other relative polarity, an overload relay responsive to the value of the current in either of said supply circuits, said overload relay being operable when the current in either supply circuit exceeds one predetermined value for a predetermined time interval to interrupt said control circuit and thus cause the control relay to interrupt said supply circuits, and an auxiliary relay responsive to the value of the current in either of said supply circuits, said auxiliary relay being operative when the current in either of said supply circuits substantially exceeds said one predetermined value to render the overload relay non-responsive to current in said supply circuits.

15. In a motor control system, in combination, an electric motor, a polarized control relay operative when energized with current of one relative polarity to establish a normal supply circuit to effect operation of the motor in one direction, said control relay being operative when energized with current of the opposite relative polarity to establish a reverse supply circuit to effect operation of the motor in the opposite direction, the control relay being operative when deenergized to interrupt both of said supply circuits, a control circuit for energizing said control relay, means for supplying to said control circuit current of one or the other relative polarity, an overload relay having a pick-up winding and a holding winding, the overload relay having contacts which are normally released and which become picked up when current of a predetermined value is supplied to the pick-up winding, said contacts being held picked up by the holding winding when said holding winding is energized, means for energizing the overload relay pick-up winding in accordance with the value of the current in either of said supply circuits, said means being operable to energize the pick-up winding with current of said predetermined value when the current in either of said supply circuits exceeds one value for longer than a predetermined time interval, the overload relay contacts being operable when picked up to interrupt energization of the control relay from said control circuit and to establish a circuit to energize said overload relay holding winding from said control circuit, and an auxiliary relay responsive to the value of the current in either of said supply circuits, said auxiliary relay being operative when the current in either of said supply circuits substantially exceeds said one value to render the overload relay pick-up winding non-responsive to current in said supply circuits.

16. In a motor control system in combination, an electric motor, a supply circuit for energizing said motor, an overload device controlling said supply circuit, a control circuit for energizing said overload device in accordance with the value of the current in said supply circuit, said overload device being operative when the current in said supply circuit exceeds one predetermined value for a predetermined time interval to interrupt said supply circuit, an auxiliary electro-responsive device, and means for energizing said auxiliary device in accordance with the value of the current in said supply circuit, said auxiliary device being operative when the value of the current in said supply circuit substantially exceeds said one predetermined value to interrupt said control circuit and thereby render said overload device non-responsive to current flowing in said supply circuit.

17. In a motor control system, in combination, an electric motor, a supply circuit for energizing said motor, a resistance element connected in series with said supply circuit, said resistance element being formed of material the temperature of which increases in accordance with the value of the current flowing therethrough, a device governed by the temperature of said resistance element for controlling said supply circuit, said resistance element and said device being selected and proportioned so that the device operates to interrupt said supply circuit when the current in said supply circuit exceeds one predetermined value for longer than a predetermined time, a circuit shunting said resistance element, an auxiliary electro-responsive device controlling said shunt circuit, and means for energizing said auxiliary device in accordance with the value of the current in said supply circuit, said auxiliary device normally interrupting said shunt circuit and being operative to establish said shunt circuit when the value of the current in said supply circuit substantially exceeds said one predetermined value to thereby prevent heating of the resistance element at such times.

BERNARD E. O'HAGAN.